US 8,836,994 B2

(12) United States Patent
Yanai et al.

(10) Patent No.: US 8,836,994 B2
(45) Date of Patent: Sep. 16, 2014

(54) DATA PROCESSING SYSTEM AND DATA PROCESSING METHOD FORMING A HIGH-QUALITY IMAGE ON A PRINTING MEDIUM BY SELECTING A MASK PATTERN DATA GROUP BASED ON A FREQUENCY CHARACTERISTIC OF THE INPUT IMAGE DATA AND MASK PATTERN DATA GROUP

(75) Inventors: Yumi Yanai, Kawasaki (JP); Hiroshi Mori, Yokohama (JP); Takahisa Akaishi, Kawasaki (JP); Yoshikazu Ishikawa, Yokohama (JP); Misae Tasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 172 days.

(21) Appl. No.: 13/457,756

(22) Filed: Apr. 27, 2012

(65) Prior Publication Data

US 2012/0281243 A1 Nov. 8, 2012

(30) Foreign Application Priority Data

May 2, 2011 (JP) ................................. 2011-102808

(51) Int. Cl.
*G06K 15/10* (2006.01)
*B41J 2/205* (2006.01)

(52) U.S. Cl.
CPC .................................. *G06K 15/107* (2013.01)
USPC ............................................ 358/1.8; 347/15

(58) Field of Classification Search
CPC ................................................... G06K 15/107
See application file for complete search history.

(56) References Cited

U.S. PATENT DOCUMENTS

| 6,158,836 | A  * | 12/2000 | Iwasaki et al. ................... 347/15 |
| 6,364,446 | B1 * | 4/2002  | Ishikawa et al. ................. 347/15 |
| 6,467,866 | B1 * | 10/2002 | Nagoshi et al. .................. 347/15 |
| 6,826,290 | B1 * | 11/2004 | Murakami et al. ............. 382/100 |
| 2002/0012018 | A1 * | 1/2002 | Ohtsuka et al. .................. 347/19 |
| 2007/0097164 | A1 * | 5/2007 | Marumoto ....................... 347/15 |
| 2007/0165054 | A1 * | 7/2007 | Shimoji ........................... 347/14 |
| 2007/0236745 | A1 * | 10/2007 | Noguchi et al. .............. 358/3.24 |
| 2008/0123148 | A1 * | 5/2008 | Takahashi et al. ............ 358/3.13 |
| 2008/0158280 | A1 * | 7/2008 | Imai ................................. 347/15 |
| 2008/0246793 | A1 * | 10/2008 | Seki et al. ........................ 347/15 |
| 2009/0015871 | A1 * | 1/2009 | Kakutani ...................... 358/3.13 |
| 2009/0040550 | A1 * | 2/2009 | Marumoto et al. .......... 358/1.15 |
| 2011/0141185 | A1 * | 6/2011 | Imai ................................. 347/19 |

FOREIGN PATENT DOCUMENTS

JP 2002-096455 A 4/2002

* cited by examiner

*Primary Examiner* — Houshang Safaipour
*Assistant Examiner* — Walter Yehl
(74) *Attorney, Agent, or Firm* — Fitzpatrick, Cella, Harper & Scinto

(57) ABSTRACT

The present invention has an objective of providing an image formation apparatus that can output binary image data on a printing medium with a favorable quality. According to the present invention, a plurality of different pieces of mask data stored in a storage unit is used to generate a plurality of different pieces of divided data. Then, the frequency characteristic information of the respective plurality of generated thinned images is calculated. Thereafter, the pieces of frequency characteristic information of the respective plurality of generated thinned images are compared to select, from among the plurality of pieces of mask data stored in the storage unit, a divided mask pattern to be used for the input image data. Then, the selected divided mask pattern is used to form the image.

10 Claims, 12 Drawing Sheets

| | MASK PATTERN | THINNED IMAGE |
|---|---|---|
| FIRST SCANNING | 41a | 43a |
| SECOND SCANNING 40a | 42a | 44a |

| | MASK PATTERN | THINNED IMAGE |
|---|---|---|
| FIRST SCANNING | 41b | 43b |
| SECOND SCANNING 40b | 42b | 44b |

| THE NUMBER OF SCANNINGS \ PRINT MEDIUM TYPE | PLAIN PAPER | GLOSS PAPER | MATTE PAPER |
|---|---|---|---|
| 2 | c21 (c21a, c21b) | c22 (c22a, c22b) | c23 (c23a, c23b) |
| | m21 (m21a, m21b) | m22 (m22a, m22b) | m23 (m23a, m23b) |
| | y21 (y21a, y21b) | y22 (y22a, y22b) | y23 (y23a, y23b) |
| | k21 (k21a, k21b) | k22 (k22a, k22b) | k23 (k23a, k23b) |
| 3 | c31 (c31a, c31b) | c32 (c32a, c32b) | c33 (c33a, c33b) |
| | m31 (m31a, m31b) | m32 (m32a, m32b) | m33 (m33a, m33b) |
| | y31 (y31a, y31b) | y32 (y32a, y32b) | y33 (y33a, y33b) |
| | k31 (k31a, k31b) | k32 (k32a, k32b) | k33 (k33a, k33b) |
| 4 | c41 (c41a, c41b) | c42 (c42a, c42b) | c43 (c43a, c43b) |
| | m41 (m41a, m41b) | m42 (m42a, m42b) | m43 (m43a, m43b) |
| | y41 (y41a, y41b) | y42 (y42a, y42b) | y43 (y43a, y43b) |
| | k41 (k41a, k41b) | k42 (k42a, k42b) | k43 (k43a, k43b) |

FIG.12

DATA PROCESSING SYSTEM AND DATA PROCESSING METHOD FORMING A HIGH-QUALITY IMAGE ON A PRINTING MEDIUM BY SELECTING A MASK PATTERN DATA GROUP BASED ON A FREQUENCY CHARACTERISTIC OF THE INPUT IMAGE DATA AND MASK PATTERN DATA GROUP

BACKGROUND OF THE INVENTION

1. Field of the Invention

The present invention relates to a data processing system and a data processing method for applying to an image formation apparatus and an image formation method according to which a print head that can jet ink is allowed to scan the same printing region on a printing medium a plurality of times to perform a printing operation to thereby complete an image to the same printing region.

2. Description of the Related Art

In the proof system to confirm an image to be printed through a printer, a Raster Image Processor (RIP) is used to output image data subjected to separation and binarization through a flat-bed machine, a digital color press (DCP), or an inkjet printer for example.

The proof system using an inkjet printer is classified to a proof system combined with RIP and a proof system as in a newspaper proof system where a combination of exclusive software application and a printer is used to perform proof-reading. In the latter proof system, an image is subjected to binarization and development by RIP and exclusive solution software developed by a software vendor different from the printer maker and is sent and outputted to a printer. Generally, in the proof system as described above, an amplitude modulation (AM) screen (hereinafter halftone dots), which is the binarization as in the offset printing, is used to realize the same image texture as that in the formal printing. The halftone dots in the offset printing of the formal printing have different resolutions (e.g., 45 lpi, 85 lpi, 175 lpi) and are used depending on a purpose. Thus, the proof system is also required to realize the printing at the same resolution as that of the halftone dots in the formal printing.

On the other hand, in a printing apparatus having a print head including a plurality of printing elements (e.g., an inkjet printer), the binarization of a document image or a photograph image is carried out by the error diffusion method having a high dispersibility. In the case of the inkjet printer, the printed image quality significantly depends on the performance of the print head itself. For example, a printed image includes uneven density depending on the ink ejecting amount or direction. In order to solve this disadvantage, Japanese Patent Laid-Open No. 2002-096455 suggests a multipass printing method. In the multipass printing method, the main scanning is performed a plurality of times in the same main scanning region on a printing medium to thereby form an image. In each main scanning (pass), a thinned image is formed based on a culling mask pattern data (pass mask) to thereby complete an image.

The thinning pattern (pass mask) used in the inkjet printer based on the multipass printing method is generally designed so that, from the viewpoint of the resistance to the landing accuracy of the print head, the layout of dots on the printing medium after the thinning operation is optimal to the final image quality. Thus, such a thinning pattern is used that is optimized to the dot pattern before the thinning operation prepared by the binarization method having a layout of highly-dispersed dots. However, when the thinning pattern that is optimized to the dot pattern prepared by the binarization method having a layout of highly-dispersed dots as described above is used to thin the image binarized by regular halftone dots, the dot layout may have a reduced dispersibility. Specifically, when such a thinning pattern is used that is not preferable to the inputted halftone dot image, a landing variation causes the image formed on the printing medium to be deteriorated due to uneven density or uneven lines.

In order to solve the above disadvantage, an approach can be used to store, in a printer in advance, halftone dot thinning patterns classified based on the binarization method (e.g., printing mode, resolution, or screen angle) so that an appropriate pattern can be specified and used for an actual printing. However, this approach causes an extreme complexity. The reason is that RIP or exclusive software solution makers in the case require huge trials and errors in addition to the understanding of the internal sequence of the printer to select an appropriate thinning pattern.

SUMMARY OF THE INVENTION

It is an objective of the present invention to provide a data processing system and data processing method which enables the image forming apparatus to form a high-quality image on a printing medium even when input image data is image data having a high regularity.

In order to achieve the above objective, the present invention has the following configuration.

The first aspect of the present invention is: a data processing system for an image formation apparatus by which a print head is allowed to scan the same printing region on a printing medium a plurality of times to perform a printing operation to thereby form an image on the same printing region, comprising: a storage unit configured to store a plurality of mask pattern data groups including a plurality of pieces of mask pattern data, the mask pattern data being used to generate divided data corresponding to printing operations in a plurality of scannings by dividing inputted image data and corresponding to the respective printing operations in a plurality of scannings; an acquisition unit configured to acquire, from among the input image data and the mask pattern data groups, information regarding a frequency characteristic of data corresponding to at least one scanning in the divided data with regard to the plurality of the mask pattern data groups; and a selection unit configured to select, based on the information and from among the plurality of mask pattern data groups, a mask pattern data group to be applied to the inputted image data for the printing.

The second aspect of the present invention is: a data processing method for an image formation apparatus by which a print head is allowed to scan the same printing region on a printing medium a plurality of times to perform a printing operation to thereby form an image on the same printing region, comprising the steps of: storing a plurality of pieces of mask pattern data groups including mask pattern data, the mask pattern data groups being used to generate divided data corresponding to printing operations in a plurality of scannings by dividing inputted image data and corresponding to the respective printing operations in a plurality of scannings; acquiring, from among the input image data and the mask pattern data groups, information regarding a frequency characteristic of data corresponding to at least one scanning in the divided data with regard to the plurality of the mask pattern data groups; and selecting, based on the information and from among the plurality of mask pattern data groups, a mask pattern data group to be applied to the inputted image data for the printing.

According to the present invention, even when input image data is image data having a high regularity such as halftone dot image data, a high-quality image can be printed on a printing medium with reduced image deterioration such as uneven density or uneven lines.

Further features of the present invention will become apparent from the following description of exemplary embodiments (with reference to the attached drawings).

BRIEF DESCRIPTION OF THE DRAWINGS

FIG. 12 illustrates an example of a mask pattern data group set and a mask pattern data group stored in a mask pattern storage unit.

DESCRIPTION OF THE EMBODIMENTS

The following section will describe in detail an embodiment of the present invention with reference to the attached drawings.

(First Embodiment)

Figure 1:
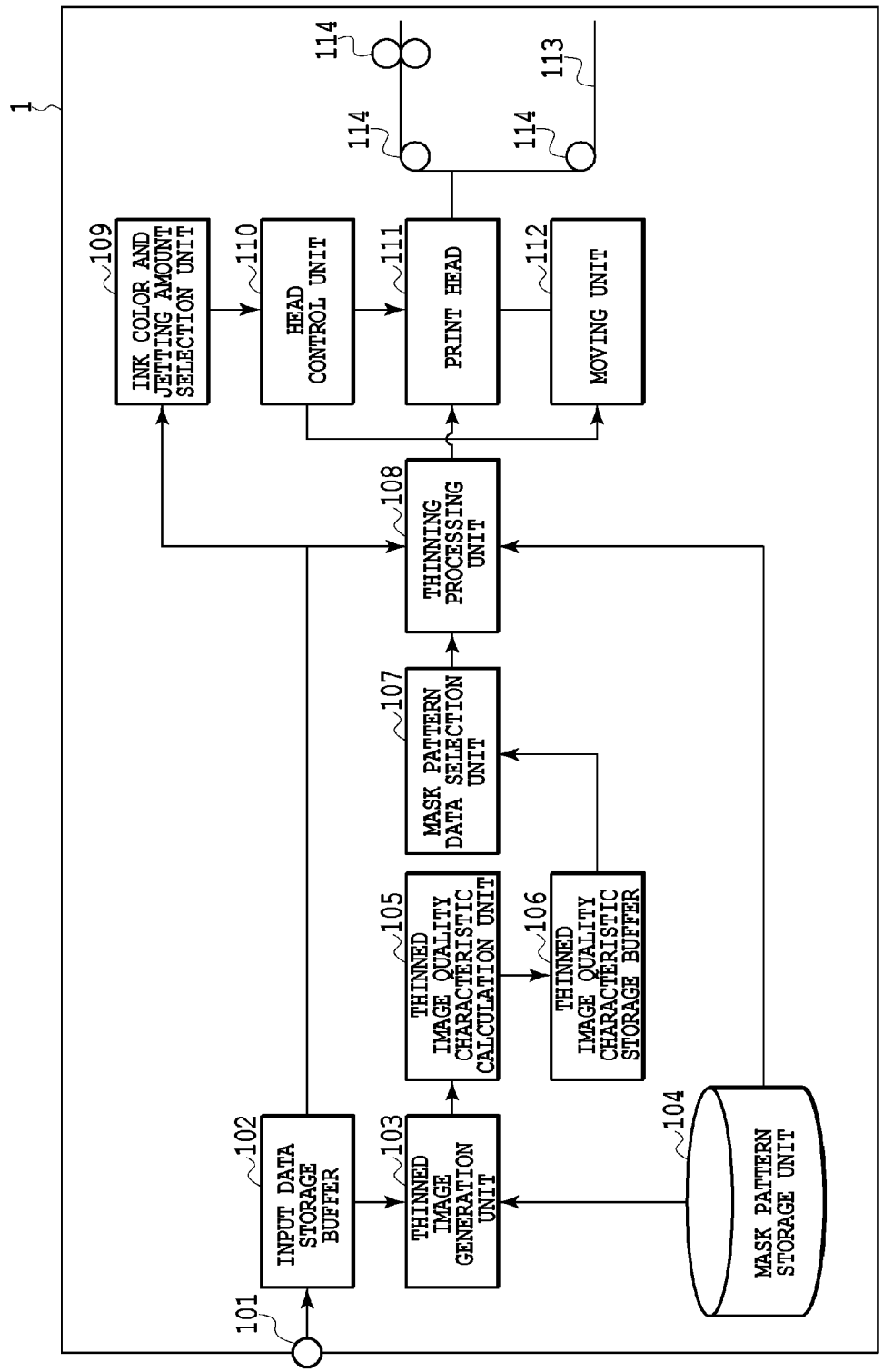
FIG. 1 is a block diagram illustrating the configuration of an image formation apparatus in the first embodiment.

FIG. 1 illustrates the configuration of the image processing of the present invention. An image formation apparatus 1 is connected to a proof system via a printer interface or a network interface. In FIG. 1, an image data input terminal 101 receives binary image data (input binary image data). This input binary data is stored in an input data storage buffer 102. The input binary data stored in the input data storage buffer 102 is binary image data corresponding to the respective plurality of ink colors used in the image formation apparatus.

A thinned image generation unit 103 generates a thinned image data as a divided image data based on the input binary data stored in the input data storage buffer 102 and the mask pattern data group stored in a mask pattern storage unit 104. The mask pattern storage unit 104 stores therein mask pattern data groups depending on the printing conditions related to the image formation by the image formation apparatus. A thinned image quality characteristic calculation unit 105 calculates image quality characteristic information (which will be described later) based on the thinned image data generated by the thinned image generation unit 103. The calculated image quality characteristic information is temporarily stored in a thinned image quality characteristic storage buffer 106.

Figure 3A:
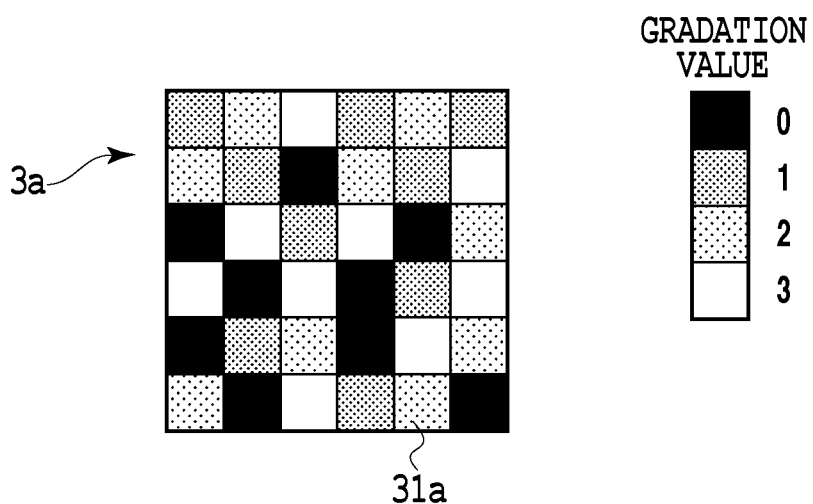
FIG. 3A illustrates an example of mask pattern data.

The mask pattern storage unit 104 stores therein a plurality of pieces of mask pattern data groups 3a as shown in FIG. 3A for example. A plurality of pieces of mask pattern data groups are set so that each group has, depending on the printing conditions, a mask pattern data group of the corresponding ink colors as one set. A plurality of different mask pattern data groups are provided in the same set for each color of ink. The printing conditions mean the conditions having an influence on the image formation operation or the image quality. The printing conditions in this embodiment are, in the so-called multipass printing method to perform a plurality of scanning operations on the same region on a printing medium to complete an image, the number at which the scanning operation is performed on the same printing region of the printing medium (pass number) and the type of the printing medium on which the image is formed. However, the printing conditions are not limited to these conditions and also may be other conditions. The mask pattern data group and the mask pattern data group set will be described later in detail with reference to FIG. 12.

Figure 3B:
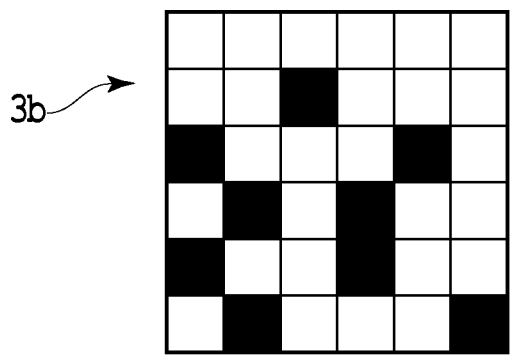
FIG. 3B shows pixels for which dot printing is allowed in the first scanning.

The mask pattern data group 3a shown in FIG. 3A shows one mask pattern data group in one mask pattern data group set. This mask pattern data group 3a is data to be used, in order to use the above-described multipass printing method, to thin the input binary image data to thereby generate divided data corresponding to the respective scannings. The mask pattern data group 3a includes a plurality of areas (cells) that respectively correspond to the regions (pixels) on which the respective dots constituting the input binary image are formed. The mask data group 3a shown in FIG. 3A is a mask pattern data group for a 4-pass printing operation to complete one region on a printing medium through 4 main scannings (passes). In the drawings, regions that can be printed through the same scanning are represented by the same gradation (density). For example, the area 31a represented by the gradation value 3 shows mask pattern data for which the dot printing is allowed in the second scanning. FIG. 3B shows pixels for which the dot printing is allowed in the first scanning. In this embodiment, an output is performed with the same printing resolution as the halftone dot image resolution (dpi) of inputted binary halftone dot image data. Thus, the mask pattern data retained in the mask pattern storage unit 104 in this embodiment has the same resolution as the halftone dot image resolution.

FIG. 12 illustrates an example the mask the pattern data group, and the mask pattern data group set stored in the mask pattern storage unit 104. In the drawing, c21, m21, y21, and k21 . . . show mask pattern data groups, respectively. These mask pattern data group sets are provided for each ink type (e.g., an ink color) used in the image formation apparatus. Further, one mask pattern data group set c21 corresponding to cyan ink is composed of a plurality of (two) mask pattern data groups c21a and c21b. One mask pattern data group m21 corresponding to magenta ink is composed of a plurality of pieces of mask pattern data m21a and m21b. Similarly, mask pattern data group sets y21 and k21 corresponding to yellow ink and black ink are each composed of two pattern data groups y21a, y21b and k21a, k21b, respectively.

As shown in FIG. 12, from the mask pattern storage unit 104, one mask pattern data group set for each ink color is selected based on the printing conditions (e.g., the number of scanning (s) (pass number) and the printing medium type). In this embodiment, any one of 2, 3, or 4 can be set as the number of scannings set to perform the multipass printing method. With regard to the printing medium type, any one can be set from among a plain paper, a gloss paper, or a matte paper. By setting the number of scannings and the printing medium type, one mask pattern data group set to be used is determined. For example, the number of scannings is set to 2 and the printing medium type is set to a plain paper. In this case, the mask pattern group set c21 corresponding to the cyan ink color and the mask pattern data group set m21 corresponding to the magenta ink color are selected. The mask pattern data group set y21 corresponding to the yellow ink color and the mask pattern data group set k21 corresponding to the black ink color are selected, respectively.

Figure 4A:
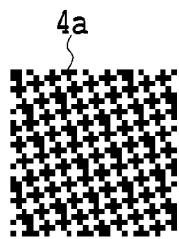
FIG. 4A and FIG. 4B illustrate an example of mask pattern data and a thinned image.
Figure 4B:
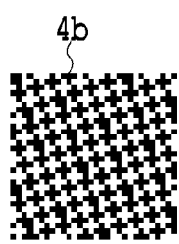

As described above, one mask pattern data group set is composed of a plurality of pieces of mask pattern data groups. The plurality of pieces of the mask pattern data groups (e.g., two groups in FIG. 12) belonging to the same mask pattern data set are different from one another. FIG. 4A and FIG. 4B illustrate an example of mask patterns of different pieces of mask pattern data belonging to the same mask pattern data set. In FIG. 4A and FIG. 4B, the reference numerals 4a and 4b show the input halftone dot data. The reference numerals 41a and 42a shows mask pattern data belonging to the mask pattern data group 40a. The reference numerals 41b and 42b also shows the same mask pattern data belonging to the mask pattern data group 40b. The mask pattern data groups 40a and 40b correspond to c22a and c22b shown in FIG. 12, respectively. The input halftone dot data 4a and the input halftone dot data 4b are data of the same pattern. The mask pattern data 41a and 42a and the mask pattern data 41b and 42b are mask pattern data that are both complementary mask pattern data and that are thinned mask pattern data as divided mask pattern data used in the 2-pass printing to complete an image by scanning the same region on a printing medium two times.

When the image formation apparatus receives the binary image data 4a, the thinned image 43a is printed in the first main scanning on the printing medium based on the thinned image data (divided data) thinned by the mask pattern data 41a. Then, in the second main scanning, the thinned image 44a is printed on the printing medium based on the thinned image data (divided data) thinned by the mask pattern data 42a. When the image formation apparatus receives the binary input halftone dot image data 4b on the other hand, the thinned image 43b is printed in the first main scanning on the printing medium based on the divided data thinned by the mask pattern data 41b. Then, in the second main scanning, the thinned image 44b is printed on the printing medium based on the divided data thinned by the mask pattern data 42b. In the mask pattern data shown in FIG. 4A and FIG. 4B, regions (pixels) shown by black represent part for which dot formation on the printing medium is allowed.

When the thinned image shown in FIG. 4A is compared with the thinned image shown in FIG. 4B, the thinned images 43a and 44a are images having an irregular dot layout while the thinned images 43b and 44b are images having a regular dot layout pattern. Thus, when a regular thinned image such as the thinned image 44b is printed in the image formation apparatus including a significant landing error, then the uneven density appears regularly, thus causing a significantly-deteriorated image quality.

To prevent this, the mask pattern data selection unit 107 determines, based on the image quality characteristic information stored in the image quality characteristic storage buffer 106, which mask pattern data can provide a favorable image quality to select the mask pattern data.

Thereafter, based on the selected mask pattern data, the input halftone dot image data is subjected to a thinning processing to thereby generate divided data corresponding to the respective scannings. Thereafter, based on the generated divided data, an image formation operation is performed. This image formation operation is performed by repeating the main scanning to move a print head while ejecting ink droplets therethrough and the sub scanning to convey the printing medium intersecting with the scanning direction by the print head. Data inputted to the image data input terminal 101 may be multivalued data. In this case, the thinning processing unit 108 subjects the multivalued data to an image thinning processing.

The image formation apparatus in this embodiment includes a plurality of print heads corresponding to a plurality of ink colors. Each print head has a plurality of nozzles arranged in a direction orthogonal to the main scanning direction. A plurality of print heads are provided in a carriage retained in the main scanning direction so as to have a reciprocating movement. The plurality of print heads and the carriage are moved (or scanned) by a moving unit 112 in the main scanning direction. The movement of the carriage and the ink ejecting through the print head are controlled by a head control unit 110. The conveyance of the printing medium in the sub scanning direction is performed by a conveying unit composed of a conveying roller 114 and a conveying motor for rotating the conveying roller 114 for example. The reference numeral 109 denotes a ejecting selection unit that selects ink colors to be ejected and the ejecting amounts from among the ink colors provided in the print head and the ink ejecting amounts that can be ejected through the print head.

A CPU realizes the processings such as the calculation, control, and determination regarding the image formation operation including the functions of the thinned image generation unit 103, the thinned image quality characteristic calculation unit 105, the thinned image quality characteristic storage buffer 106, the mask pattern data selection unit 107, the thinning processing unit 108, the ink color and ejecting amount selection unit 109, and the head control unit 110 for example.

The operation in the first embodiment will be described below based on the flowchart shown in FIG. 2. First, when binary image data is inputted via the input terminal 101, the input image data is stored in the input data storage buffer 102 (Step S101). The inputted image data may include, for example, image data having a high dispersibility obtained by the error diffusion processing for example and image data having a high regularity (e.g., halftone dot image data).

Next, the currently-set conditions are determined by a printing conditions determination unit 120 (Step S102). Thereafter, from among a plurality of mask pattern data group sets stored in the mask pattern storage unit 104, mask pattern data group set suitable for the currently-set printing conditions is selected (Step S103).

Figure 5:
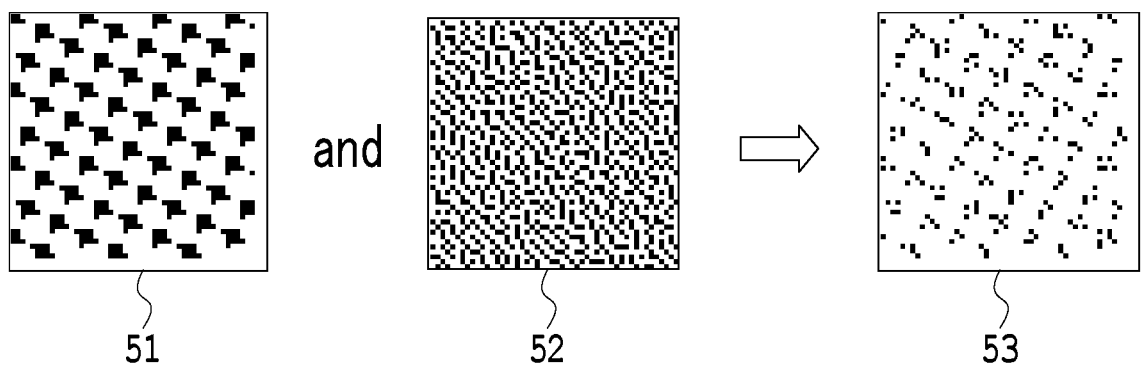
FIG. 5 illustrates a thinned image generation processing.

The next processing is to select the input image data stored in the input data storage buffer 102 and an arbitrary one mask pattern data group in a plurality of mask pattern data groups constituting the mask pattern data group set selected in Step S103 (Step S104). The next processing is to use the selected arbitrary one mask pattern data to generate the thinned image data as the divided data of the input image data (Step S105). As shown in FIG. 5, the divided data (thinned image data) is generated by obtaining the logical AND (AND) of the binary input value image data 51 and the mask pattern data 52 in the selected one mask pattern data group. The next processing in Step 106 is to calculate the thinned image quality characteristic information based on the divided data. The details in the processing in Step S106 will be detailed later.

The thinned image quality characteristic information calculated in Step S106 is stored in the thinned image quality characteristic storage buffer 106 (Step S107). The next processing is to determine whether the above-described processings from S105 to S107 were performed using all mask pattern data group in a plurality of pieces of mask pattern data groups constituting the mask pattern data group set selected in Step 103 (Step S108). When Step 108 determines that the mask pattern data group includes mask pattern data group not used in the processings of Steps S105 to S107 (mask pattern data group not selected in Step S104), the processing returns to Step S104. Then, the mask pattern data group not selected in Step S104 is selected. Then, the processings in Steps S105 to S107 are performed. For example, when the mask pattern data group set is composed of two pieces of mask pattern data groups, then an arbitrary one piece of mask pattern data is firstly used to generate divided data for a plurality of scannings. Next, based on the generated divided data for a plurality of scannings, the frequency characteristic of the mask pattern data group is calculated and is stored in the thinned image quality characteristic storage buffer 106. Thereafter, the other mask pattern data group of the mask pattern data group set is used to similarly generate a plurality of pieces of divided data. Based on the plurality of pieces of divided data, the image quality characteristic information is calculated and stored.

The next processing is to compare a plurality of pieces of image quality characteristic information stored in the thinned image quality characteristic storage buffer 106 to select optimal mask pattern data group based on which divided data showing the highest image quality characteristic can be generated (Step S109). The next processing is to use the optimal mask pattern data selected in Step S109 to subject the input image data to the thinning processing to thereby generate thinning data (divided data) (Step S110).

The mask pattern data group selection processing of Steps S103 to S109 and the thinning processing of Step S110 are performed on each piece of image data when the input image data is a plurality of pieces of color image data corresponding to the ink colors.

Next, Step S111 selects the ink color and the ejecting amount suitable for the input image data and starts an image formation based on the divided data generated in Step S110. Then, when all input image data is already subjected to the image formation operation, the image formation operation is completed (S112).

The image formation is performed by ejecting ink on the printing medium 113 based on the divided data generated in Step S110 while performing the main scanning to move the plurality of print heads 111 and the carriage in a fixed direction. In this embodiment, the so-called multipass printing method is used in which the print head 111 is allowed to scan the same region on a printing medium a plurality of times to thereby complete the image on the region. The multipass printing operation may include the one to use different nozzle groups of the print head to the same printing region on a printing medium to perform printing and the one to use the same nozzle group to perform printing on the same printing region. The above processings can be used for both of these multipass printing operations.

Figure 6:
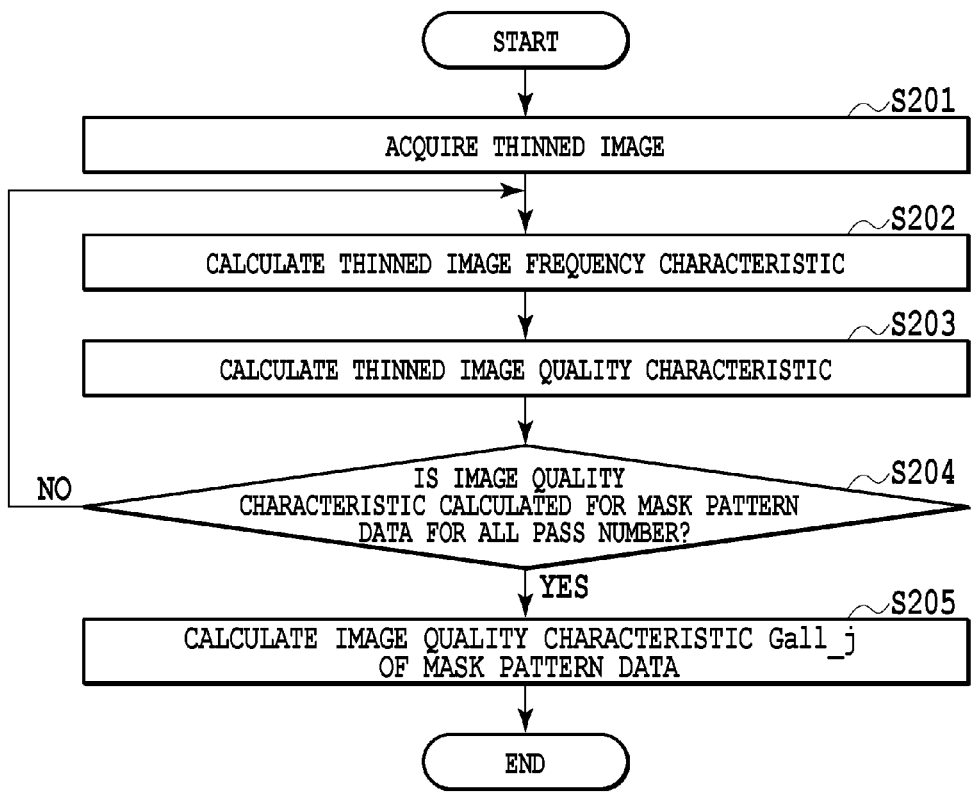
FIG. 6 is a flowchart illustrating a thinned image quality characteristic calculation processing of the first embodiment.

The following section will describe, with reference to the flowchart of FIG. 6, the image quality characteristic information calculation processing of the thinned image performed in the above-described Step S107.

First, the thinned image quality characteristic calculation unit 105 acquires the divided data prepared by the thinned image generation unit 103 (Step S201). This divided data is data composed of binary data (0 or 1) showing whether ink is ejected through the print head or not.

Next, the thinned image quality characteristic calculation unit 105 uses a two-dimensional Fourier transform processing to calculate the two-dimensional frequency characteristic Fp_i (u, v) of the divided data (Step S202) in which "i" shows an integer in a range from 1 to N and "N" shows a pass number. The thinned image size is represented by M×M (the longitudinal size X the lateral size).

Next, Step S203 calculates, with regard to the calculated two-dimensional frequency characteristic Fp_i(u, v) for the thinned image, the integrated value Gi of the spectrums included in the region having a frequency equal to or lower than an arbitrary frequency p (cycle/mm) based on the following formula 1. Then, the calculated integrated value Gi is assumed as the image quality characteristic of the thinned image.

$$G_i = \frac{1}{MM} \sqrt{\sum_{u=-M/2+1}^{N/2} \sum_{v=-M/2+1}^{M/2} |Fp\_i(u, v)|^2} \quad \text{(formula 1)}$$

$$u^2 + v^2 \leq p^2$$

In this embodiment, the value Gi shows a frequency component equal to or lower than the arbitrary frequency P in the thinned image. When the value of a low-frequency component in the thinned image relatively increases, the decline of the image quality is increased when the printing apparatus has a high landing variation. The above-described arbitrary frequency value P (cycle/mm) also can be calculated based on another method considering the visual characteristic of human for example. For example, when the human visual characteristic is assumed as VTF (u, v), then the frequency component value Gi_vtf in the thinned image is calculated by the formula 2.

$$G_i\_\text{vft} = \frac{1}{MM} \sqrt{\sum_{u=-M/2+1}^{N/2} \sum_{v=-M/2+1}^{M/2} |VTF(u, v)Fp\_i(u, v)|^2} \quad \text{(formula 2)}$$

Next, Step S204 determines whether the mask pattern data for all scannings generated by the mask pattern data group acquired in Step S201 is subjected to the above calculation of the image quality characteristic Gi or not. Then, the processings of Steps S202 and S203 are repeated until the mask pattern data for all scannings is subjected to the calculation of the image quality characteristic Gi. For example, when assuming that the mask pattern data group set selected in Step S103 is m41 in FIG. 12, the divided data generated by the mask pattern data 41a is subjected to the calculation of the image quality characteristics $G_1$ to $G_4$ for the divided data of each of the 4 scannings.

Thereafter, Step S205 calculates, based on the calculation by the following formula 3, the sum Gall_j of the image quality characteristics Gi of the respective pieces of divided data corresponding to the respective scannings. For example, when the mask data set selected in Step S103 is m41 in FIG. 12, then Step S204 calculates the sum Gall_j of the values of the image quality characteristic $G_1$, $G_2$, $G_3$, and $G_4$ of the divided data. In the formula 3, "j" is an integer in a range from 1 to K and "K" is the number of thinned images generated by the mask pattern data group (scanning number (pass number)).

$$\text{Gall\_j} = \sum_{i=1}^{K} Gi \quad \text{(formula 3)}$$

The sum Gall_j calculated in the manner as described above is the image quality characteristic information of the image data obtained by the arbitrary one mask pattern data group selected from the mask pattern data group set in Step S104. The calculated image quality characteristic information Gall_i is stored, as described for Step 17 in FIG. 2, in the thinned image quality characteristic storage buffer 106. Thereafter, the processings of Steps S104 to S107 are repeated based on the determination in Step S108 as described above. Then, the image quality characteristic information of the image of all mask pattern data groups in the same mask pattern data group set is stored in the thinned image quality characteristic storage buffer 106.

In the above-described operation in Step S109 to select the mask pattern data, the mask pattern data selection unit 107 is allowed to compare the image quality characteristic information stored in the thinned image quality characteristic storage buffer 106 to select the thinning mask pattern data. In this embodiment, the values of the image quality characteristic Gall_j of the divided data for the respective scannings generated by the respective mask pattern data group are compared to select the mask pattern data group having the lowest Gall value. This can consequently suppress, even when an image formation apparatus having a landing error receives regular binary image data such as halftone dot image data, the occurrence of a regular uneven density, thus providing the formation of an image having a favorable image quality. Thus, when the mage formation apparatus in this embodiment is used in a proof system, an image having the similar texture as that in the formal printing can be formed.

Figure 2:
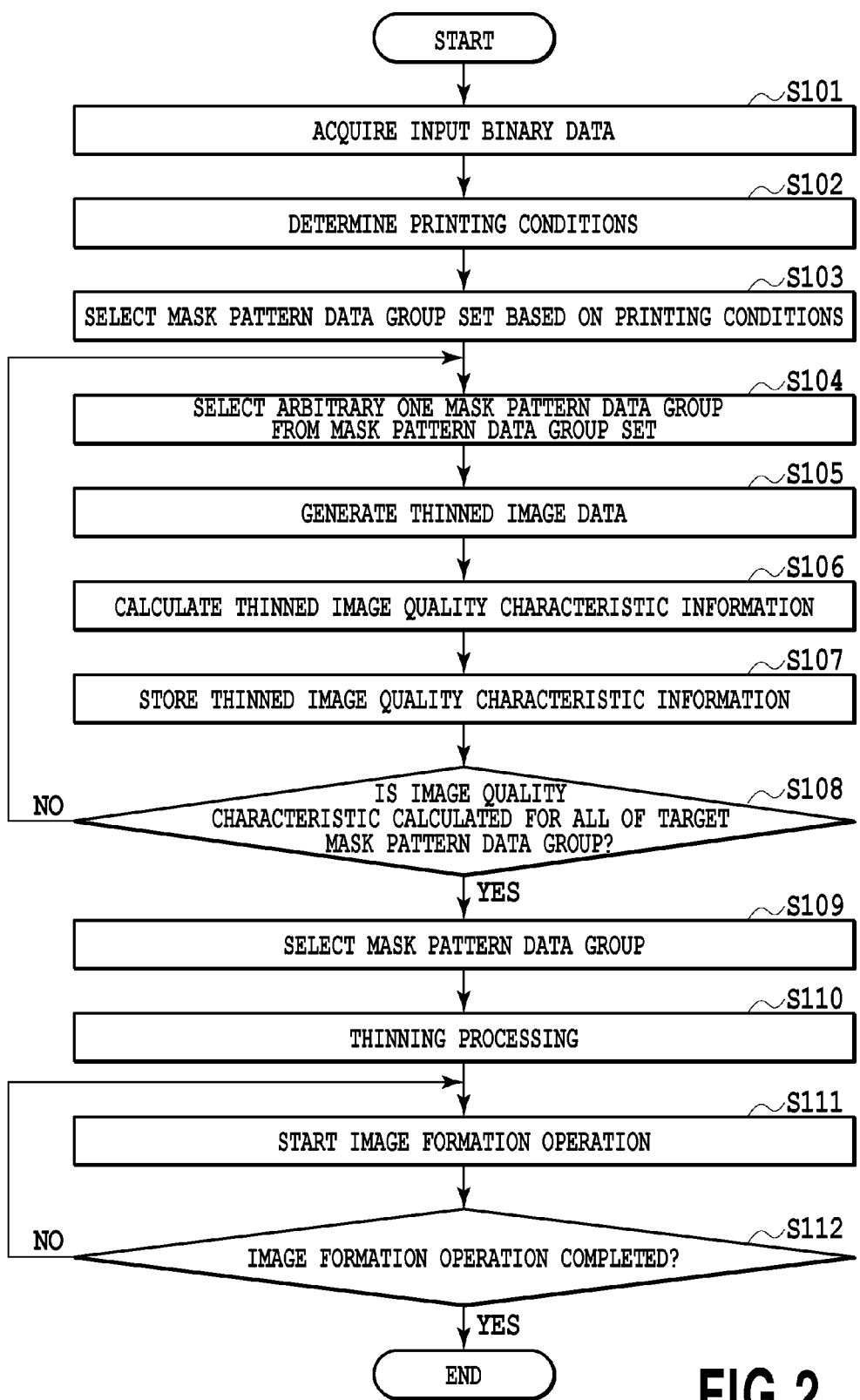
FIG. 2 is a flowchart illustrating the image formation apparatus in the first embodiment.

This embodiment also can be used for input image data other than the binary halftone dot image data (e.g., input image data subjected to a binarization processing by the error diffusion processing or the dithering processing) to provide a favorable image by performing the processings shown in FIG. 2 and FIG. 6.

(Second Embodiment)

Figure 7:
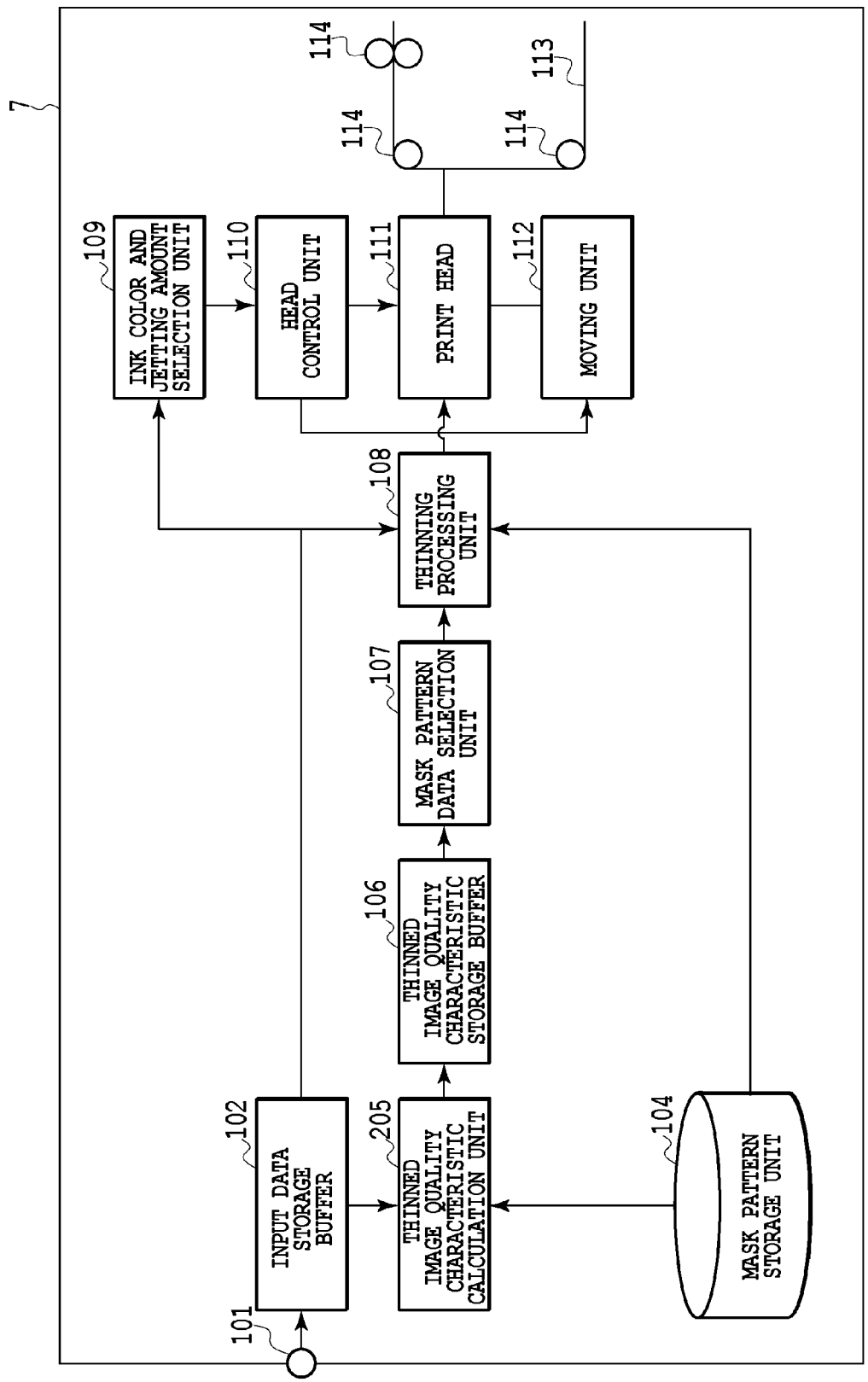
FIG. 7 is a block diagram illustrating the configuration of the image formation apparatus in the second embodiment.

Next, the second embodiment of the present invention will be described with reference to FIG. 7 to FIG. 12. FIG. 7 illustrates the configuration of the image processing apparatus in the second embodiment. In the second embodiment, the apparatus performed by the thinned image quality characteristic calculation unit 205 is different from that performed by the thinned image quality characteristic calculation unit 205 provided in the first embodiment. Specifically, the thinned image quality characteristic calculation unit 205 in the second embodiment receives the input image data stored in the input data storage buffer 102 and the data stored in the mask pattern storage unit 104 to calculate the thinned image quality characteristic based on these pieces of data.

In the second embodiment, the input data stored in the input data storage buffer 102 is composed of binary image data generated based on the halftone dot image and the information regarding the number of screen lines (lpi) of the halftone dot image and the screen angle(°). In this embodiment, the input image data is binary halftone dot image data corresponding to a plurality of ink colors used in the image formation apparatus, respectively.

Figure 8:
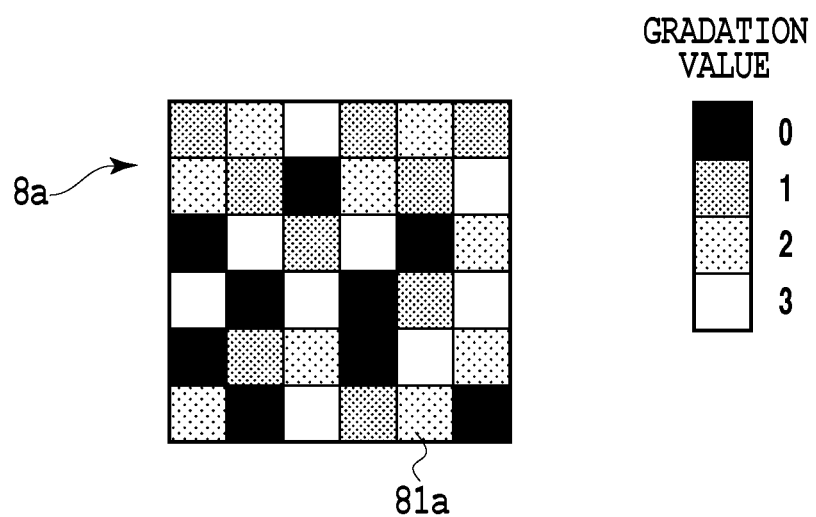
FIG. 8 illustrates an example of a mask pattern data group.
Figure 9A:
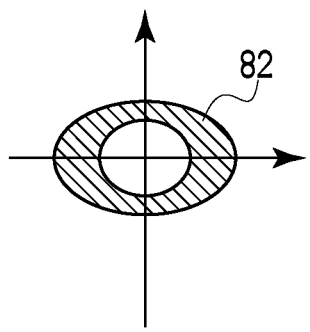
FIG. 9A to FIG. 9D illustrate the frequency characteristic information of the mask pattern data.
Figure 9B:
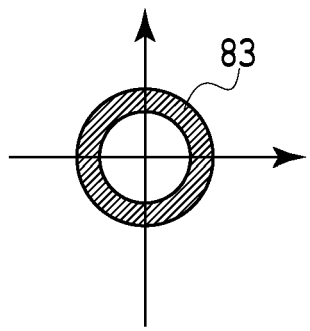
Figure 9C:
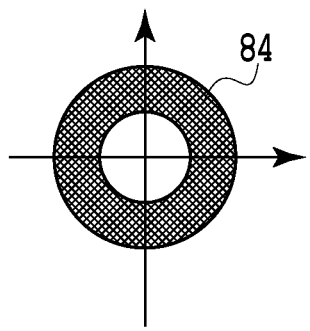
Figure 9D:
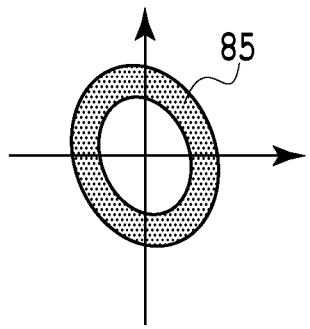

The mask pattern storage unit 104 stores therein the mask pattern data group 8a as shown in FIG. 8 as well as the frequency characteristic information of the mask pattern data as shown in FIG. 9A to FIG. 9D. The mask pattern data group 8a shown in FIG. 8 shows, as in FIG. 3A, a mask pattern data group for 4-pass printing. In FIG. 8, regions that can be printed through the same scanning are represented by the same gradation (density). A plurality of pieces of mask pattern data groups are retained in the mask pattern storage unit 104 so that each group has, depending on the printing conditions, a mask of the corresponding ink colors as one set. The printing conditions mean the conditions having an influence on the image formation operation or the image quality. As in the first embodiment, the printing conditions in this second embodiment are, in the multipass printing method, the number at which the scanning operation is performed on the same printing region of the printing medium (pass number) and the type of the printing medium on which the image is formed. In the second embodiment, mask pattern data groups determined for each ink color will be referred to as the mask pattern data group set as in the first embodiment and an example thereof is shown in FIG. 12.

FIG. 9A to FIG. 9D illustrate the frequency characteristic of the pattern arranged in the first scanning of the mask data 8a. The frequency characteristic is represented in a two-dimensional frequency space. The other configurations in FIG. 7 are the same as those shown in FIG. 1. Thus, the same or similar components in FIG. 7 and FIG. 1 are denoted with the same reference numeral and will not be further.

Figure 10:
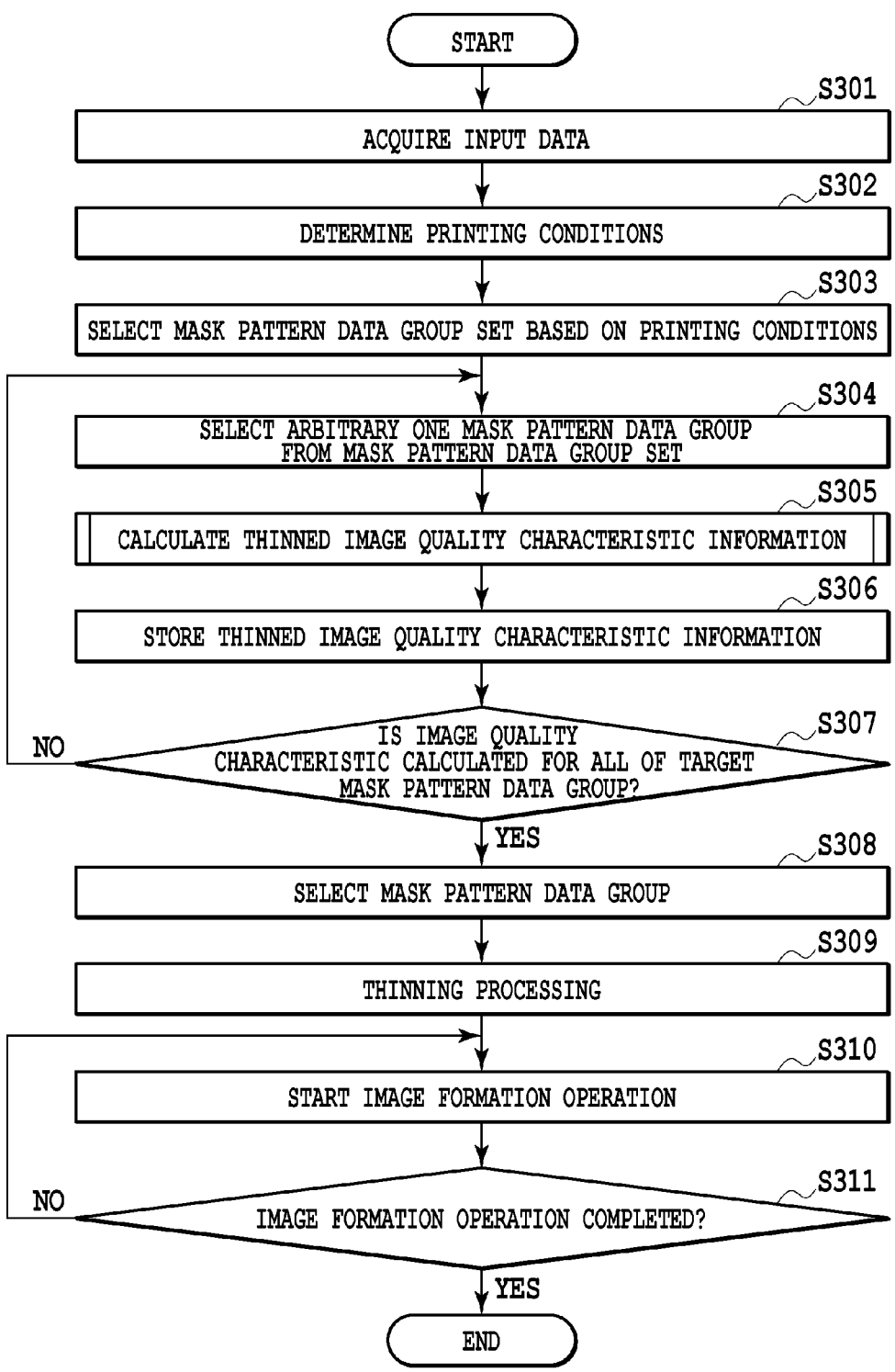
FIG. 10 is a flowchart illustrating the operation of the image formation apparatus of the second embodiment.

The following section will describe the operation of the second embodiment shown in the flowchart of FIG. 10. First, when binary image data is inputted via the input terminal 101, the input image data is stored in the input storage buffer 102 (Step S301). The inputted image data is assumed to be halftone dot image data.

Next, the currently-set printing conditions are determined by the printing conditions determination unit 120 (Step S302). Thereafter, from among a plurality of mask pattern data group set stored in the mask pattern storage unit 104, a mask pattern data group suitable for the currently-set printing conditions is selected (Step S303).

The next processing is to select the data stored in the input data storage buffer 102 and arbitrary one mask pattern data among a plurality of pieces of mask pattern data group constituting the mask pattern data group set selected in Step S304 (Step S304). Thereafter, based on input image the data group stored in the input data storage buffer 102 and the mask pattern data stored in the mask pattern storage unit 104, the image quality characteristic information of the thinned image is calculated (Step S305). The details of the processing in Step S305 will be detailed later.

The next processing is to store the thinned image quality characteristic information calculated in Step S305 in the thinned image quality characteristic storage buffer 106(Step S306). The next processing is to determine whether the above-described processings in S305 and S306 are performed on all of the mask pattern data group among the plurality of pieces of mask pattern data group set constituting the mask pattern data set selected in Step S304 or not (Step S307). When it is determined that the mask pattern data group set includes mask pattern data group not used in the processings in Steps S305 and S306 (mask pattern data not selected in Step S304), then the processing returns to Step S304. Thereafter, the processings of Steps S304 to S307 are repeated to calculate and store the image quality characteristic information to all of the mask pattern data group in the mask pattern data group set.

The next processing is to compare the image quality characteristic information corresponding to the plurality of mask pattern data stored in the thinned image quality characteristic storage buffer 106 to select optimal mask pattern data to output inputted binary halftone dot image data (Step S305). Next, the optimal mask pattern data group selected in Step S305 is used to subject the input binary halftone dot image data to a thinning processing to thereby generate divided data. The next processing is to select the ink color and the ejecting amount suitable for the input image data to thereby start the image formation (Step S310). When all of the input image data is already subjected to the image formation operation, the image formation operation is completed. In this embodiment, the image formation operation is performed also based on the multipass printing method.

Figure 11:
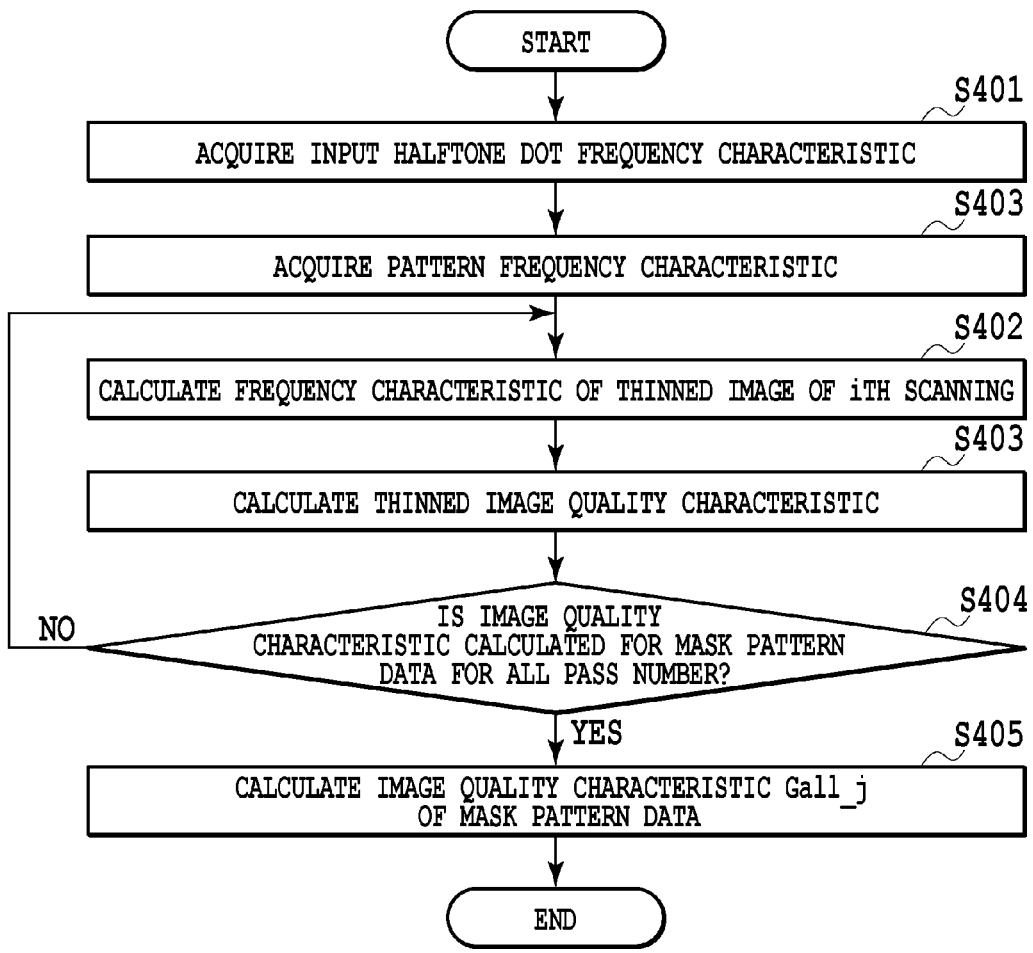
FIG. 11 is a flowchart illustrating the thinned image quality characteristic calculation processing of the second embodiment.

Next, the image quality characteristic calculation processing of the above-described thinned image will be described with reference to FIG. 11.

The thinned image quality characteristic calculation unit 106 uses the frequency characteristic of the input binary halftone dot image data and the frequency characteristic of the mask data to calculate the frequency characteristic of the thinned image data (divided data) to assume this as the image quality characteristic information. Generally, the when halftone dot frequency characteristic (spectrums) is represented in a two-dimensional frequency space, the halftone dots have a cyclic nature in a specific direction and thus a high value showing a cyclic nature appears in a local region in the frequency space. Therefore, the direction of the frequency characteristic of the input halftone dot image can be assumed based on the angle(°) of the halftone dots. A region including spectrums can be assumed based on the resolution (dpi) and the number of lines (lpi) (see table 1). A spectrum has such an amplitude at a frequency at which the spectrum appears that is determined by the input value of the image inputted in the halftone dot processing. Thus, the frequency characteristic of the input halftone dot image can be predicted approximately.

TABLE 1

| Number of screen lines (lpi) | Screen angle (°) | Space frequency (l/mm) |
|---|---|---|
| 45 | 0 | 1.77 |
|  | 30 | 1.53 |
| 85 | 0 | 3.35 |
|  | 45 | 2.37 |
| 175 | 0 | 6.89 |
|  | 75 | 1.78 |

The processing in this embodiment is to calculate, as the frequency characteristic of the input halftone dot image used to calculate the frequency characteristic of the thinned image, the frequency characteristic F_in (u, v) when the solid image on the entire face having the pixel value 11 is inputted is based on the number of lines (lpi) and the angle(°) (Step S401). The next processing is to allow the mask pattern storage unit 104 to acquire the frequency characteristic of the target mask pattern data group for which the image quality characteristic information is calculated (Step S402). Thereafter, based on the input halftone dot image frequency characteristic F_in (u, v) and the mask pattern data frequency characteristic Fmask_i (u, v) at the ith scanning, the thinned image frequency characteristic Fp_i (u, v) at the ith scanning is calculated. This calculation is calculated, as shown by the formula 5, by the convolution of two pieces of frequency characteristic data (Step S403).

$$Fp\_i(u,v)=F\_in(u,v)*Fmask\_i(u,v) \quad \text{(formula 5)}$$

i=an integer in a range from 0 to N (N is a pass number)
u and v are a coordinate in the two-dimensional frequency space.

In this embodiment, the two-dimensional space frequency characteristic between passes of each mask pattern data and the two-dimensional frequency characteristic of the input halftone dot both have a size equal to longitudinal size X lateral size=M×M for example.

Next, with regard to Fp_i (u, v), the spectrum integrated value Gi included in a region having a frequency equal to or lower than the arbitrary frequency P (cycle/mm) is calculated based on the above-described formula 1. Then, the calculated spectrum integrated value Gi is assumed as the image quality characteristic of the thinned image of the ith scanning (Step S404). As described in the first embodiment, Gi is a value showing the frequency component in the thinned image. When the value of a low-frequency component in the thinned image relatively increases, the decline of the image quality is increased when the printing apparatus has a high landing variation. The above-described arbitrary frequency value P (cycle/mm) also can be calculated based on another method considering the visual characteristic of human for example.

Next, Step S405 determines whether the calculation is performed on the mask pattern data for all scannings or not. Until the image quality characteristic Gi is calculated for the mask pattern data for all scannings, the above processings of Steps S403 and S404 are repeated.

Thereafter, Step S406 calculates the sum Gall_j of the thinned image quality characteristics Gi calculated for the respective scannings based on the above-described formula 3 (Steps S403 and 404) to store the sum in the thinned image quality characteristic storage buffer 106. In the above processing, "j" is an integer in a range from 1 to K and "K" is the number of thinned images generated by mask pattern data (number of scannings (pass number)).

The sum Gall_j calculated in the manner as described above is the image quality characteristic information of the image data obtained by arbitrary one mask pattern data selected in Step S104 from the mask pattern data set. The calculated image quality characteristic information Gall_j is, as described in Step 306 of FIG. 10, stored in the thinned image quality characteristic storage buffer 106. Thereafter, the processings of Steps S304 to S306 are repeated based on the determination in Step S307 as described above. Then, the image quality characteristic information of the image obtained through all mask pattern data group in the same mask pattern data group set is stored in the thinned image quality characteristic storage buffer 106.

Thereafter, Step S308 selects the mask pattern data group corresponding to the minimum value in the image quality characteristic information Gall_j stored in the thinned image quality characteristic storage buffer 106. Based on the selected mask pattern data group, the image formation operation is performed (Steps S310 and S311).

(Third Embodiment)

Next, the following section will describe the third embodiment of the present invention. The third embodiment is the same as the first or second embodiment except for the image quality characteristic calculation processing unit for a thinned image. Thus, the other processings are the same as those in the first or second embodiment. Thus, the following section will describe the difference from the first or second embodiment only.

The image quality characteristic calculation unit in the third embodiment is configured to consider the characteristic of ink ejected through the print head in order to calculate the sum of the thinned image quality characteristics Gi in the respective scannings. Specifically, in this embodiment, when assuming that inks ejected through the print head are composed of C (cyan), M (magenta), Y (yellow), and K (black), then the relation in the density of the respective inks is assumed as K>M>C>Y. When the thinned image quality characteristics for the respective inks are assumed as G_K, G_C, G_M, and G_Y, then the thinned image quality characteristic Gall_j at a certain mask pattern data group j for all inks is calculated based on the following formula 5.

$$Gall\_j=w1 \cdot G\_K+w2 \cdot G\_C+w3 \cdot G\_M+w4 \cdot GY \quad \text{(formula 5)}$$

In the formula, w1, w2, w3, and w4 are weight coefficients determined depending on the respective inks and have the relation of w1>w2>w3>w4(formula 6).

As shown in the formula 5, the thinned image quality image characteristics of the respective inks are multiplied with the weight coefficient wi (I is an integer in a range from 1 to S and S is the number of ink types) so that the weight coefficient wi increases with an increase of the density of the ink as shown in formula 6. The reason is that the decline of the image quality when the a landing variation occurs in the printing apparatus including ink having a high density has a higher influence, when compared with the decline of the image quality of ink having a low density, on the image quality of the final image formed by all of the inks. As described above, the third embodiment provides the calculation of the thinned image quality characteristic depending on the density of the ink itself. Thus, an image having a more favorable quality can be formed. Furthermore, the functions of the input data storage buffer 102, the thinned image generation unit 103, the mask pattern storage unit 104, the thinned image quality characteristic calculation unit 105, the image quality characteristic storage buffer 106, the mask pattern data selection unit, and the thinning processing unit 108 also can be achieved by a host apparatus having a single or a plurality of computer (s), and the ejecting amount selection unit 109, the head control unit 110, the print head 111, the moving unit 112, and the roller 114 also may be included in the image formation apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-102808, filed May 2, 2011, which is hereby incorporated by reference herein in its entirety.

What is claimed is:

1. A data processing system for an image formation apparatus by which a print head is allowed to scan the same printing region on a printing medium a plurality of times to perform a printing operation to thereby form an image on the same printing region, the system comprising:
    a storage unit configured to store a plurality of mask pattern data groups including a plurality of pieces of mask pattern data, the mask pattern data being used for dividing inputted image data to generate divided data corresponding to printing operations of a plurality of scannings of the print head;
    an acquisition unit configured to acquire information regarding a frequency characteristic of an image indicated by data corresponding to at least one scanning in the divided data with regard to the plurality of the mask pattern data groups, based on the input image data and the mask pattern data groups; and
    a selection unit configured to select, based on the frequency characteristic represented by the information acquired by the acquisition unit, from among the plurality of mask pattern data groups, a mask pattern data group to be applied to the inputted image data for the printing.

2. The data processing system according to claim 1, wherein the acquisition unit acquires color frequency characteristic information of the divided data based on the frequency characteristic of the input image data and the frequency characteristic of the mask pattern data group.

3. The data processing system according to claim 1, wherein the acquisition unit generates, based on the input image data and the mask pattern data group, the divided data corresponding to at least one scanning of the plurality of scannings to acquire frequency characteristic information of the divided data.

4. The data processing system according to claim 1, wherein the acquisition unit calculates the frequency characteristic of the inputted binary image data based on the number of lines and angle of the halftone dots of the binary image data, and
    the selection unit compares the pieces of frequency characteristic information of the respective images corresponding to a plurality of pieces of divided data to select, from among the plurality of pieces of mask pattern data groups stored in the storage unit, a mask pattern data group to be used for the image data.

5. The data processing system according to claim 1, wherein the acquisition unit calculates the frequency characteristic information of the image divided data corresponding to the divided data by multiplying, with regard to the frequency characteristic information of the image calculated for the respective ink colors used to form the image, a larger coefficient with ink having a higher density to add the corresponding to frequency characteristic information to the divided data corresponding to the respective ink colors multiplied with the coefficient.

6. A data processing method for an image formation apparatus by which a print head is allowed to scan the same printing region on a printing medium a plurality of times to perform a printing operation to thereby form an image on the same printing region, the method comprising the steps of:
    storing a plurality of pieces of mask pattern data groups including mask pattern data, the mask pattern data groups being used for dividing inputted image data to generate divided data corresponding to printing operations of a plurality of scannings of the print head
    acquiring, information regarding a frequency characteristic of an image indicated by data corresponding to at least one scanning in the divided data with regard to the plurality of the mask pattern data groups, based on the joint image data and the mask pattern data groups; and
    selecting, based on the frequency characteristic represented by the information acquired in the acquiring step, from among the plurality of mask pattern data groups, a mask pattern data group to be applied to the inputted image data for the printing.

7. The data processing method according to claim 6, wherein the acquiring step acquires color frequency characteristic information of the divided data based on the frequency characteristic of the input image data and the frequency characteristic of the mask pattern data group.

8. The data processing method according to claim 6, wherein the acquiring step generates, based on the input image data and the mask pattern data group, the divided data corresponding to at least one scanning of the plurality of scannings to acquire frequency characteristic information of the divided data.

9. The data processing method according to claim 6, wherein the acquiring step calculates the frequency characteristic of the inputted binary image data based on the number of lines and angle of the halftone dots of the binary image data, and
    the selecting step compares the pieces of frequency characteristic information of the respective images corresponding to a plurality of pieces of divided data to select, from among the plurality of pieces of mask pattern data groups stored in the storage unit, a mask pattern data group to be used for the image data.

10. The data processing method according to claim 6, wherein the acquiring step calculates the frequency characteristic information of the image divided data corresponding to the divided data by multiplying, with regard to the frequency characteristic information of the image calculated for the respective ink colors used to form the image, a larger coefficient with ink having a higher density to add the corresponding to frequency characteristic information to the divided data corresponding to the respective ink colors multiplied with the coefficient.

* * * * *